United States Patent [19]
Cycon et al.

[11] Patent Number: 5,152,478
[45] Date of Patent: Oct. 6, 1992

[54] UNMANNED FLIGHT VEHICLE INCLUDING COUNTER ROTATING ROTORS POSITIONED WITHIN A TOROIDAL SHROUD AND OPERABLE TO PROVIDE ALL REQUIRED VEHICLE FLIGHT CONTROLS

[75] Inventors: James P. Cycon, Orange; Kenneth M. Rosen, Guilford; Andrew C. Whyte, Norwalk, all of Conn.

[73] Assignee: United Technologies Corporation, Hartford, Conn.

[21] Appl. No.: 526,092

[22] Filed: May 18, 1990

[51] Int. Cl.⁵ .................. B64C 29/00; B64C 39/06
[52] U.S. Cl. ........................... 244/12.2; 244/26; 244/17.11
[58] Field of Search ........... 244/12.2, 23 C, 26, 244/17.23, 17.11; 416/128, 129

[56] References Cited
U.S. PATENT DOCUMENTS

| | | | |
|---|---|---|---|
| 2,935,275 | 5/1960 | Grayson | 244/23 C |
| 2,966,318 | 12/1960 | Chodan | 244/23 C |
| 3,002,709 | 10/1961 | Cochran | 244/12.2 |
| 3,103,327 | 9/1963 | Parry | 244/23 C |
| 3,409,249 | 11/1968 | Bergquist et al. | 244/17.13 |
| 3,477,168 | 11/1969 | Trodglen | 244/23 C |
| 4,163,535 | 8/1979 | Austin | 244/17.23 |
| 4,196,877 | 4/1980 | Mutrux | 244/12.2 |
| 4,796,836 | 1/1989 | Buchelt | 244/23 R |
| 5,035,377 | 7/1991 | Buchelt | 244/12.1 |

FOREIGN PATENT DOCUMENTS

| | | | |
|---|---|---|---|
| 2718178 | 11/1978 | Fed. Rep. of Germany | 244/12.2 |
| 75976 | 7/1961 | France | 244/23 C |

*Primary Examiner*—Galen Barefoot
*Attorney, Agent, or Firm*—Vernon F. Hauschild

[57] ABSTRACT

An unmanned flight vehicle wherein two counter-rotating rotors are positioned within a toroidal fuselage and in which rotor pitch solely is utilized to generate all required lift, pitch, roll, yaw and vibration and stress control for the vehicle.

17 Claims, 8 Drawing Sheets

UNMANNED FLIGHT VEHICLE INCLUDING COUNTER ROTATING ROTORS POSITIONED WITHIN A TOROIDAL SHROUD AND OPERABLE TO PROVIDE ALL REQUIRED VEHICLE FLIGHT CONTROLS

TECHNICAL FIELD

This invention relates to an unmanned flight vehicle wherein two counter-rotating rotors are positioned within a toroidal shroud or fuselage in which rotor pitch change is utilized to generate all required lift, pitch, roll and yaw control plus vibration and stress control, and to regulate the pattern and velocity of air flow into the toroidal fuselage to establish complimentary control forces on the fuselage which cooperate with the control forces generated by the rotors to provide all required flight controls for the vehicle.

BACKGROUND OF THE INVENTION

In the flight vehicle art, many propeller driven and circularly shaped vehicles have been tested, but they all require apparatus in addition and independent of the flight generating apparatus to control the flight of the vehicle. One of the most troublesome problems with the prior art designs is the nose-up pitching moment created during forward flight of the vehicle, and which must be compensated for. This nose-up moment encountered by the prior art was a limiting factor in these vehicles.

An example of this prior art is the Hiller Flying Platform. The Hiller design incorporates two counter-rotating propellers surrounded by a shroud. The propellers were set at a fixed pitch and the amount of lift the propellers generated was controlled by the rotational speed of the propellers. The platform was stabilized and controlled in forward flight by a man leaning back and forth thereby creating a moment about the center of gravity of the platform. In later designs, flow vanes were installed below the propellers to act as additional control surfaces.

Another example of the prior art is AROD, Airborne Remotely Operated Device. AROD incorporates a single rigid propeller in a shroud. Torque to counteract the propeller torque is obtained by placing flow vanes below the propeller. These vanes are movable and deflected proportionally to the amount of anti-torque required. These vanes were also used to control the vehicle in both pitch and roll. Because AROD used only a single propeller, gyroscopic coupling of aircraft pitch and roll existed, and a cross rate feedback control system was required to stabilize the air vehicle.

While Sikorsky Aircraft has used counterrotating rotors, such rotors were unshrouded. Further, while Aerospatiale has used a single shrouded fan as an anti-torque tail rotor for a helicopter, that single shrouded fan had no cyclic pitch control.

DISCLOSURE OF THE INVENTION

Therefore, it is an object of this invention to teach an unmanned flight vehicle which comprises two counter-rotating rotors positioned within a toroidal shroud or fuselage and in which pitch control of the rotors provides all flight control requirements of the vehicle including lift, pitch, roll and yaw control plus vibration and stress control.

It is a further object of this invention to teach such a vehicle wherein the shroud or fuselage is a closed toroid so that it constitutes a strong structure, and which is fabricated of composite materials such that it is a light structure. The fuselage is fabricated and designed to house all necessary equipment and payload including surveillance and reconnaissance equipment, and other equipment which permit it to perform decoy, jamming, target designation, data acquisition, and harassment type missions.

It is still a further object of this invention to teach such an unmanned aerial vehicle which is safe in operation, simple in construction, and survivable under anticipated operating conditions and capable of entering areas where manned vehicles could not penetrate.

A further feature of this invention is that the toroidal shroud or fuselage houses all required propulsion, avionic, fuel, payload and other flight related hardware in such a fashion that the vehicle remains in balance.

It is a very important feature of this invention that the counter-rotating rotors have capability for both collective and cyclic pitch control, and therefore operable, in cooperation with a toroidal fuselage or shroud to provide all required control of the vehicle in both hover and flight, thereby eliminating the requirement for additional surfaces or equipment to control the vehicle in flight.

It is also an important feature of this invention that the toroidal fuselage is shaped, particularly the inlet thereof, such that there is the capability and advantage of selective distribution of system lift between the rotor and the fuselage or shroud.

It is still an important teaching of this invention that blade cyclic pitch is utilized to effect the pattern of and velocity of air flow entering the inlet of the fuselage duct to thereby selectively control the lift generated by the fuselage to effect the desired control of the vehicle, whether pitch, roll or yaw.

It is still a further feature of this invention to teach such a vehicle in which the rotors are supported from the toroidal fuselage by a plurality of support struts extending therebetween and fabricated of composite material to be of maximum strength and minimum weight, and also to be hollow so as to be capable of housing pitch control servos, the drive shaft between the fuselage housed engine and the rotors, and other desirable equipment such as stability gyros.

It is still a further feature of our invention to teach such a vehicle in which the rotors cooperate to cancel the torque and gyroscopic loads which each generate.

It is still a further object of this invention to teach such a vehicle including appropriate inlet air filtration to protect the rotor systems from foreign object damage.

It is still a further feature of this invention that the enclosing of the rotors within the toroidal fuselage prevents the formation of tip vortices and obstructs the free radiation of sound waves, and also provides protection from operating personnel inadvertently being struck by a rotor blade.

It is still a further object of this invention to teach such a vehicle which is capable of vertical take-off and landing.

It is still a further important feature of this invention that the control moments produced by the application of cyclic pitch to the rotors are amplified by the control moments generated by the fuselage as a result thereof.

Other objects, features and advantages of the invention will become apparent in light of the following description thereof.

BEST MODE OF CARRYING OUT THE INVENTION

Figure 1:
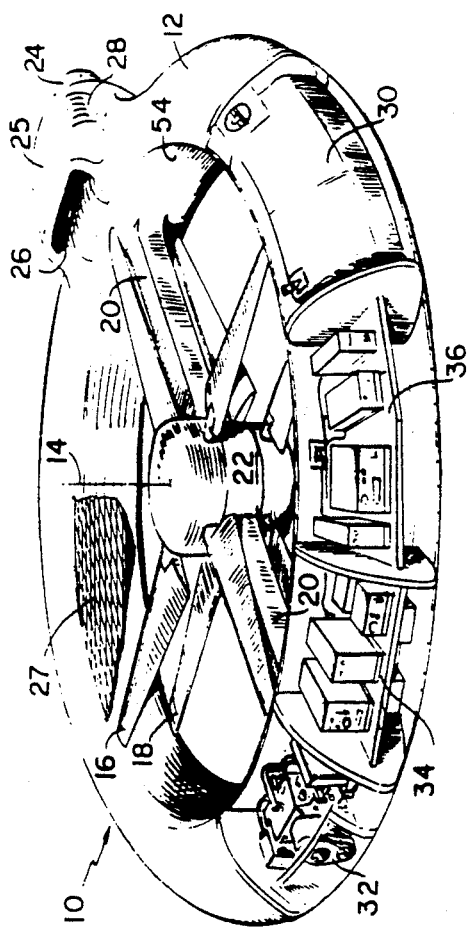
FIG. 1 is a perspective showing of our unmanned flight vehicle, partially broken away to illustrate some of the equipment and payload carried within the vehicle fuselage.

Referring to FIG. 1, we see our unmanned flight vehicle 10 which comprises toroidal shroud or fuselage 12, and counter-rotating multi-bladed rotors 16 and 18 positioned therewithin so as to be rotatable about axes of rotation coincident with fuselage axis 14. A plurality of support struts 20 extend from the inner periphery of toroidal fuselage 12 radially inwardly to support rotor housing 22. Support strut 20 extends into and is rigidly attached in conventional fashion or bonded to fuselage 12 such that a rigid structure is formed.

An engine 24 is located at the 0° or 360° tail station of toroidal fuselage 12 and serves as the propulsion unit for vehicle 10. Air enters the engine housing through inlet 26. Toroidal fuselage 12 is substantially hollow and is therefore capable of carrying fuel tanks such as 30 on diametrically opposite sides thereof, and other necessary cargo and equipment such as some sort of a payload 32, which may be a sensor or the like, at the 180° nose position of the toroidal fuselage so as to balance the engine 24. Additional equipment such as avionic equipment 34 and navigation equipment 36 can be selectively positioned within the hollow fuselage 12, and other electronic devices such as data links and data antennae would be positioned diametrically opposite the aviation and navigation equipment to keep the vehicle 10 balanced and in trim.

Fuselage 12 and struts 20 are preferably made of composite material such as a plurality of high tensile strength fibers bonded in epoxy resin to produce both a strong and a light weight structure. Fuselage 12 is also, importantly, a closed toroid to produce a maximum strength structure.

Figure 2:
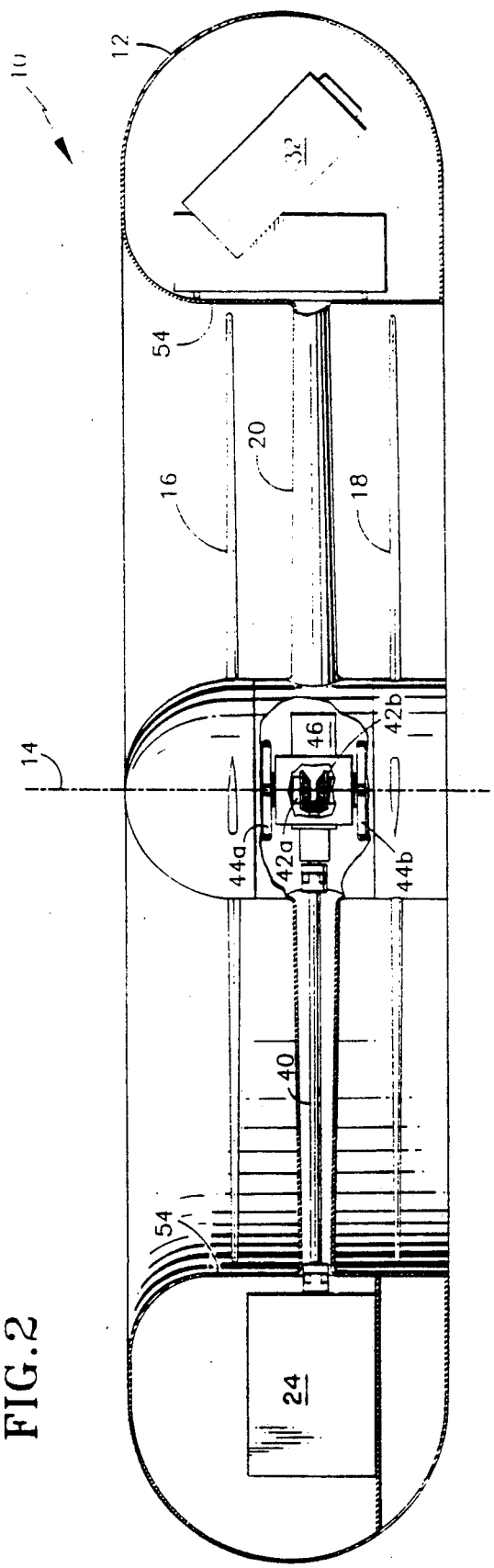
FIG. 2 is a cross-sectional showing through our flight vehicle to show the manner of mounting of the rotors and the rotor drive mechanisms.

Now referring to FIG. 2, we see the manner in which the counter-rotating rotors 16 and 18 are driven by engine 24 which is positioned within toroidal fuselage 12. In conventional fashion, appropriate clutch and drive mechanism drives drive shaft 40, which extends through hollow support strut 20 and between fuselage 12 and rotor housing 22, drives conventional gearing, shown at 42a and 42b, to drive rotors 16 and 18 about toroid axis and their own axis of rotation 14 in a counter rotating fashion. Each rotor is provided with a conventional swashplate mechanism 44a and 44b, which are controlled by electronic servos, such as the one shown at 46, to selectively impart both cyclic blade change and collective blade change to the blades of rotors 16 and 18. Rotors 16 and 18 are preferably of the rigid rotor type, rather than the articulated type. Swashplates 44a, 44b, and their related mechanism may be of the type shown in U.S. Pat. Nos. 2,957,527 and 3,409,249 and the electronic servo system may be of the type disclosed in U.S. patent application No. 07/454,488 filed Dec. 21, 1989, and entitled Servo Control System For a Co-axial Rotary Winged Aircraft by J. Cycon et al. Engine 24 is preferably positioned diametrically opposite a payload such as shown at 32 for purposes of vehicle balance. Payload 32 could preferably be a conventional electronic sensor. A data link and a data link antenna are installed so that the data collected by the vehicle can be transmitted to ground control.

Inlet screen 27, shown partially in FIG. 1, is positioned so as to cover the inlet of duct 54 of fuselage 12 to protect the rotors from foreign objects.

Figure 3:
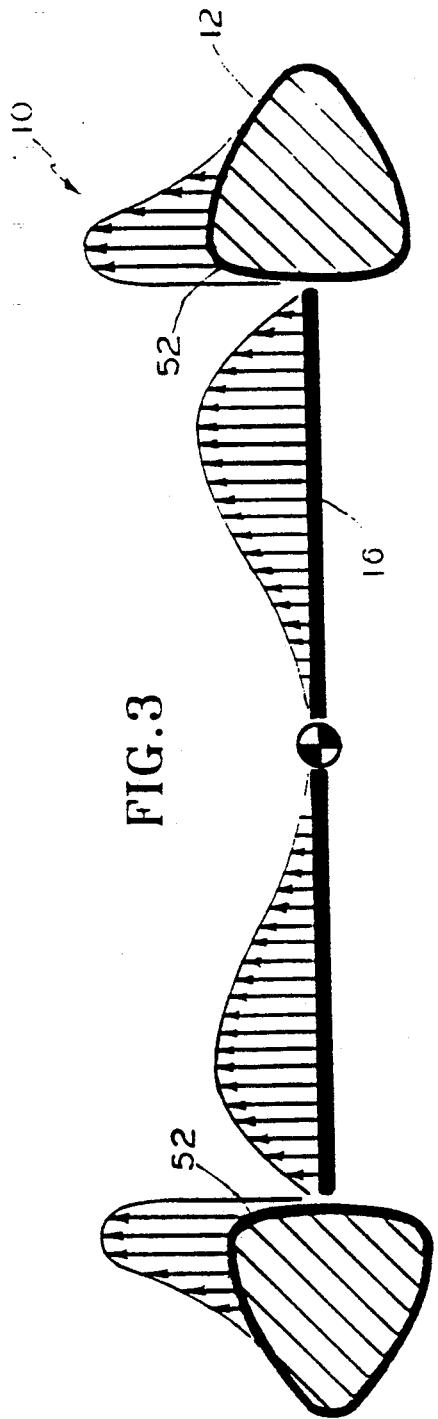
FIG. 3 is an illustration of the aerodynamics of our flight vehicle in hover and with collective pitch only applied to the rotor blades.

To best understand the operation and advantages of our flight vehicle, reference will now be made to FIG. 3 which demonstrates the aerodynamics of our flight vehicle in hover and with collective pitch only applied. It will be noted by viewing FIG. 3 that with rotor 16 in operation and under collective pitch only, lift forces are being generated by the rotor and also at the inlet section of fuselage 12. This is because as the rotor rotates, it draws air into and across the inlet 52 of fuselage 12 at a high velocity, thereby inducing a suction at shroud inlet 52 so as to produce the lift effect on the shroud or fuselage 12 as shown in FIG. 3. It will therefore be seen that in our vehicle, lift is being generated by both the rotor and the shroud, and these lift forces are additive. By proper design of inlet 52 of the fuselage 12, and rotor placement, the fuselage 12 and rotor 16 can be caused to selectively share the lift generating function, and approximate equal sharing would be preferred.

Figure 4:
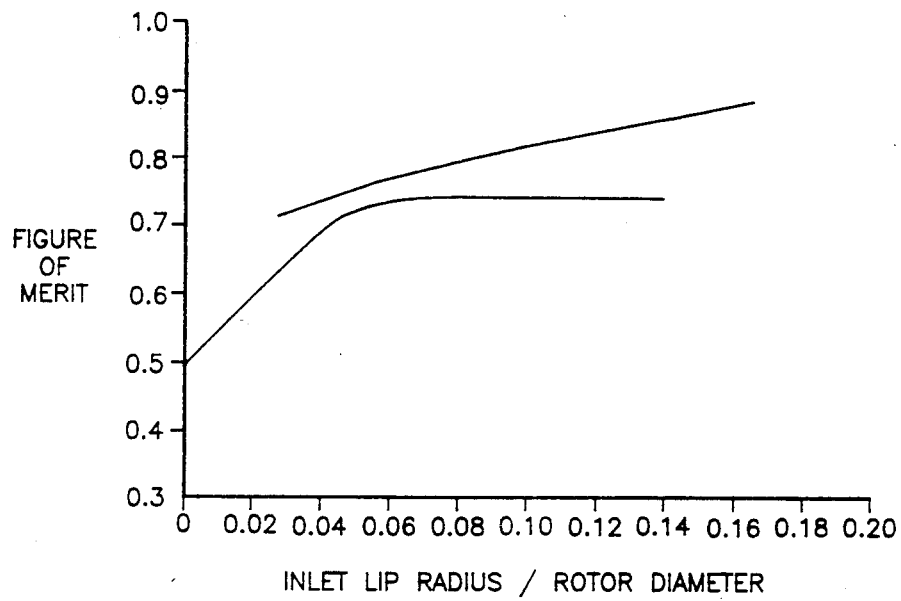
FIG. 4 is a graph showing the ratio of the fuselage or shroud inlet lip radius to the rotor diameter plotted against a figure of merit to illustrate the inlet radius effect.

The effect of the radius of inlet 52 of fuselage 12 is best understood by viewing FIG. 4 wherein the ratio of the inlet lip radius of the fuselage to the propeller diameter is plotted against the figure of merit which is the actual power required to create lift in a particular vehicle versus the ideal power to accomplish this. FIG. 4 shows curves plotted for two sets of data. Each curve clearly shows that as the lip radius to propeller diameter ratio increases, the efficiency of the system increases. The curves also demonstrate that at about 0.04 ratio of inlet lip radius to propeller diameter, the figure of merit is about 0.7, and increases very little above that ratio, but drops off drastically below that ratio.

Figure 5:
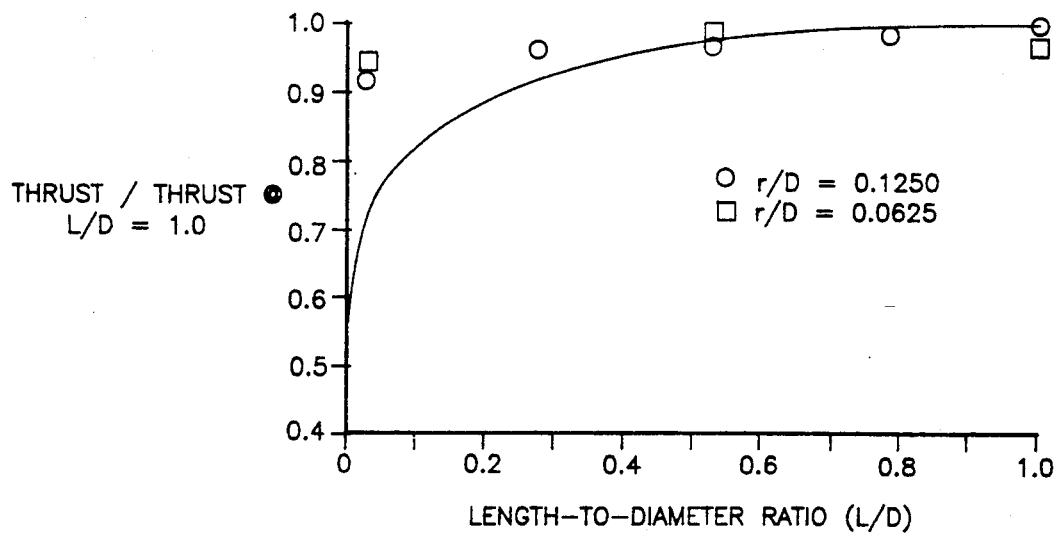
FIG. 5 is a graph showing the ratio of the length or height of the fuselage duct through which air passes in passing through the rotors to the diameter of the rotors plotted against rotor thrust so generated divided by shroud thrust so generated to illustrate the duct length effect.

Now viewing FIG. 5, we see the effects of the length or height of the duct 54 created by the inner periphery (See FIG. 2) of fuselage 12. FIG. 5 is a graph of the length of duct 54-to-the diameter of rotors 16 or 18 plotted against the ratio of the thrust generated by the rotor to the thrust generated by the fuselage. The graph of FIG. 5 demonstrates that the greater the height or length of the toroidal fuselage duct 54, the greater the change of achieving a 50-50 split between rotor thrust and shroud thrust or lift, assuming a proper selection of radius as discussed in connection with FIG. 4. With the fuselage and rotor sharing the load, smaller rotors can be used and, therefore, the size and weight of the vehicle can be reduced.

Figure 6:
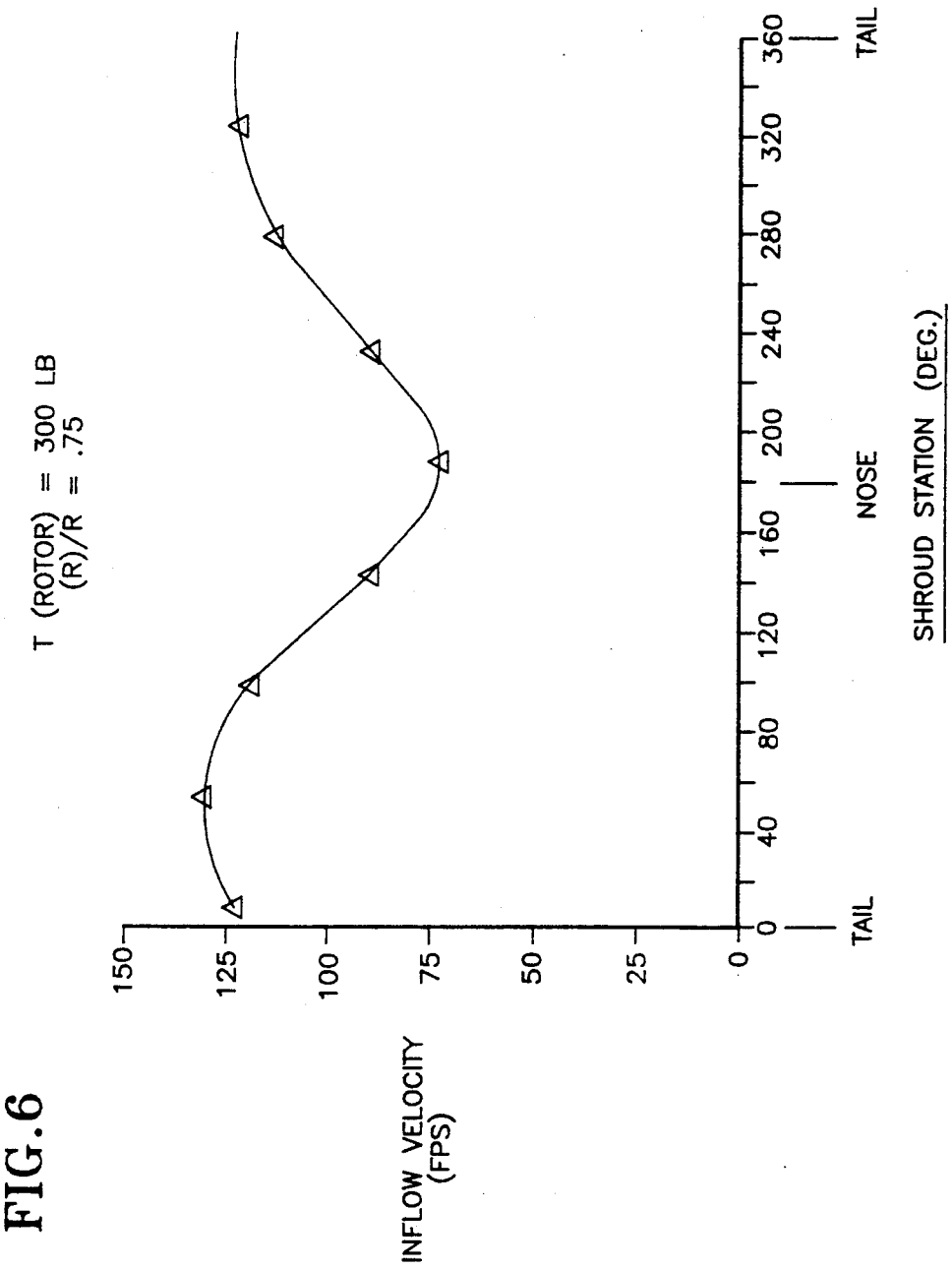
FIG. 6 is a graph illustrating the inlet flow velocity variation or pattern at the various stations around the periphery of toroidal fuselage in which 180°, the nose of the vehicle, is the forward direction, and 0° and 360° are the aft direction or tail of the vehicle, caused by the application of cyclic pitch to the rotor blades.

A very important effect is achieved in our vehicle when cyclic pitch is applied to the blades of rotors 16 and 18 within toroidal fuselage 12 since, as shown in FIG. 6, which is a graph of the inflow velocity to duct 54 against the various azimuthal positions around fuselage 12 and in which 0° and 360° represent the rear or tail direction station and 180° represents the most forward or nose station on the fuselage 12. It will be noted that when cyclic pitch is applied to the rotor blades, the inflow velocity distribution is caused to vary and produces a pitching moment about the vehicle center of gravity due to this inflow variation. By selective application of cyclic pitch, the inflow velocity can be maximum or minimum at any of the selected shroud stations shown in FIG. 6.

Figure 7:
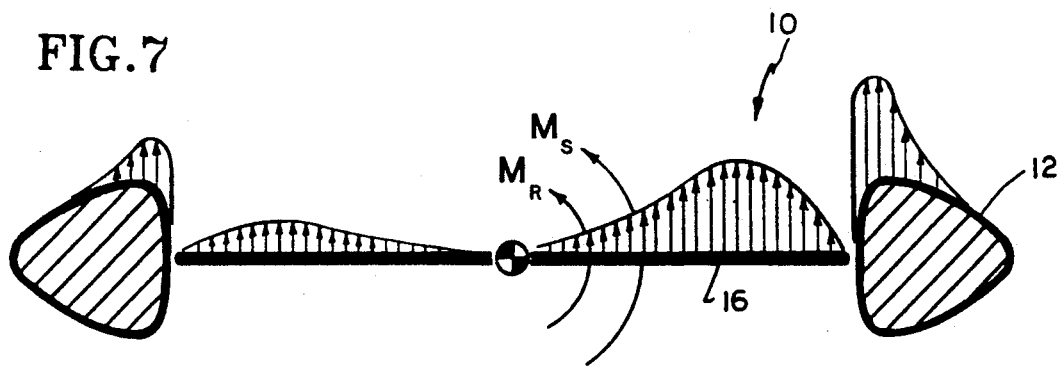
FIG. 7 is a representation of the aerodynamics of our vehicle in hover with both collective and cyclic pitch applied to the rotor blades to illustrate the pitching moments created by each.

The effect of cyclic pitch application to the blades of rotors 16 and 18 within fuselage 12 is illustrated in FIG. 7 in which our vehicle 10 is shown in hover, and in the collective pitch condition shown in FIG. 6, but with cyclic pitch added thereto. It will be noted by viewing FIG. 7 that with both collective and cyclic pitch applied to the rotors of vehicle 10 in hover, both the fuselage 12 and rotor 16 are generating lift, that these lifts are additive, and that both the rotor and the shroud are generating pitching moments illustrated as $M_S$ and $M_R$, respectively, which are also additive.

Figure 8:
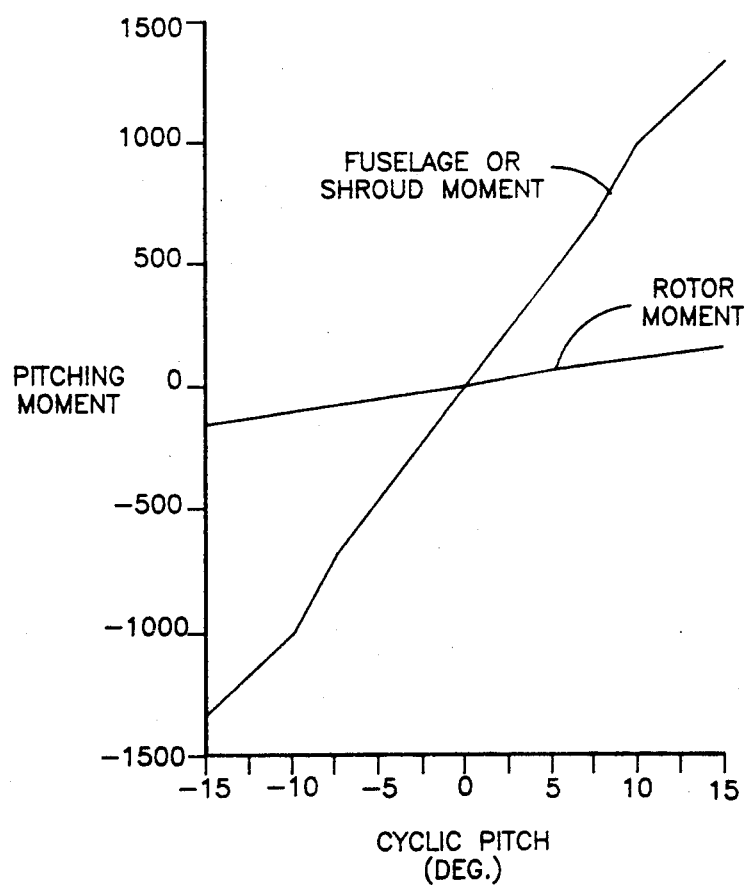
FIG. 8 is a graph of cyclic pitch input to the rotors plotted against the pitching moment created by the rotor and the pitching moment created by the fuselage in hover.

To appreciate the magnitude of the pitching moment of the fuselage 12 and rotor 16, reference will now be made to the graph shown in FIG. 8 which is a graph of pitching moment of each the rotor and the fuselage plotted against the degrees of cyclic pitch applied to rotors 16 and 18. It will be noted that of the total moment produced by vehicle 12 in the FIG. 7 condition, a substantial amount of the total moment is produced by the shroud, as compared to the moment produced by the rotor. Therefore, changes in rotor loading produce changes in the shroud loading or pitching moment and, therefore, in the system moment. This rotor control amplification becomes very important when one examines the forward flight characteristics of our vehicle 10.

It should be borne in mind that, as explained earlier, a failing of the prior art flight vehicles was the need to utilize complicated and heavy equipment to counteract the nose-up moment generated during flight. We will now describe how this nose-up moment is generated and how our invention overcomes the nose-up moment encountered in forward flight without the need for additional controls or equipment.

Figure 9:
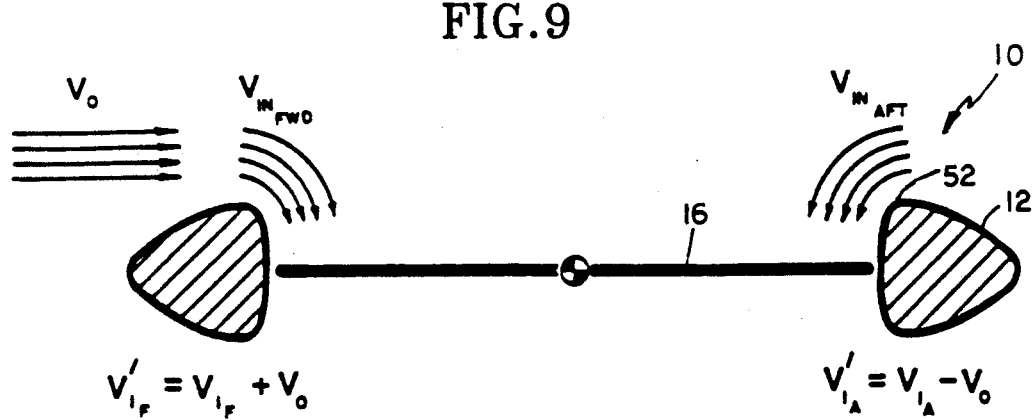
FIG. 9 is an aerodynamic representation of our toroidal fuselage in forward flight to illustrate the velocity distribution of the air entering the fuselage duct to pass through the rotors.

FIG. 9 illustrates the airflow distribution over inlet 52 of toroidal fuselage 12 during forward flight. It will be noted that the free stream velocity in forward flight $V_O$ is additive to and serves to increase the velocity over the 180° or forward station of toroidal shroud or fuselage 12, and to decrease the inlet velocity at the aft most 360° station so that the resulting inflow velocity at the 180° station is substantially larger than the velocity of the air entering fuselage 12 at the aft or 360° station. This results in a pressure or lift distribution differential illustrated in FIG. 10 which is substantially larger at the 180° forward station shown on the left in FIGS. 9 and 10 then at the aft 360° station shown on the right of FIGS. 9 and 10, thus producing the nose-up moment illustrated in FIG. 10 as fuselage 12 moves in forward flight.

Figure 10:
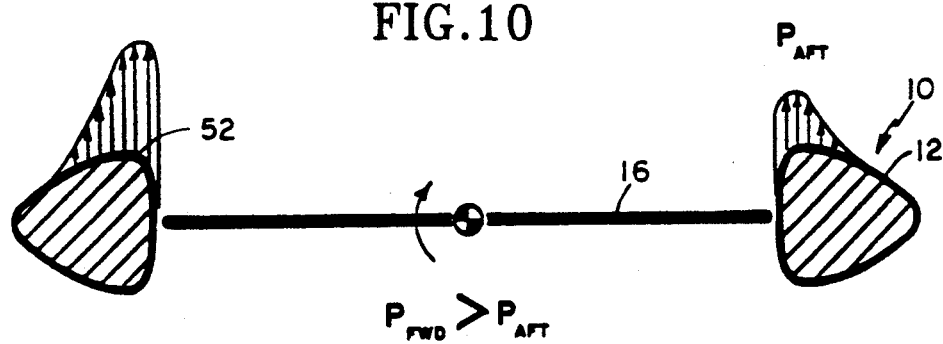
FIG. 10 is an aerodynamic representation of our vehicle showing our toroidal fuselage in forward flight to illustrate the pressure distribution on the fuselage caused by the velocity distribution illustrated in FIG. 9 so as to produce a nose-up pitching moment on the fuselage.
Figure 11:
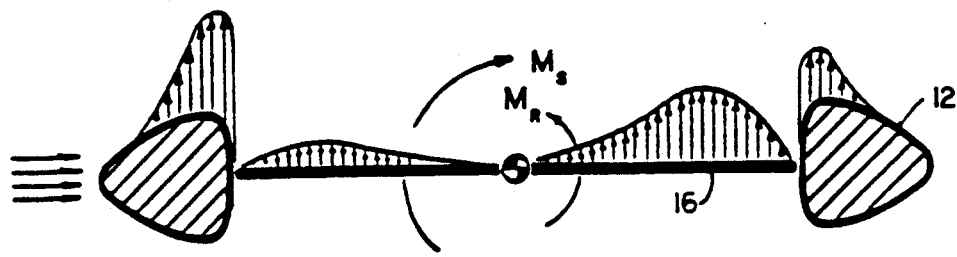
FIG. 11 is an aerodynamic representation of our vehicle in forward flight with both cyclic and collective pitch applied to illustrate the opposite moments created by the rotor cyclic lift loads and the shroud cyclic lift loads.

Now considering our vehicle 10 in forward flight, and with both collective and cyclic pitch applied to rotors !6 an 18, attention is called to FIG. 11 in which it will be noted that the lift or moment creating characteristics of fuselage 12 remain as illustrated in FIG. 10, but so as to produce nose-up moment $M_S$. However, when cyclic pitch is applied so as to cause the flow of inlet air into the shroud duct 54 to be maximum at the 0° or aft station as shown in FIG. 6, a counteracting nose-down moment is created on the fuselage which coacts with the nose-down moment $M_R$ produced by rotor 16.

Figure 12:
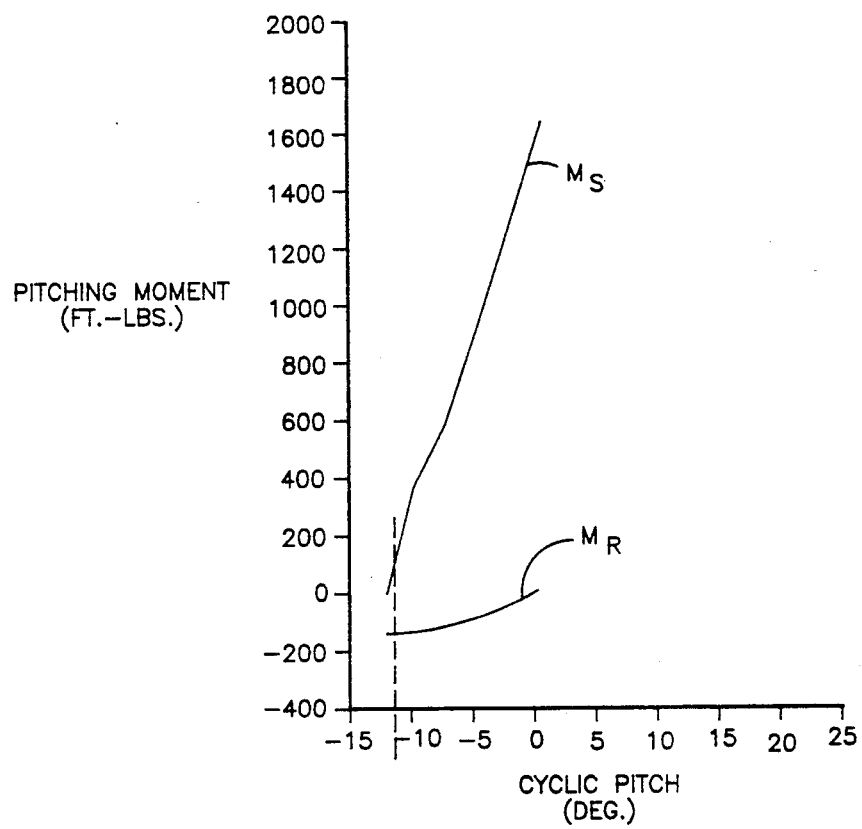
FIG. 12 is a graph showing the pitching moment created on the shroud and the rotor, separately, plotted against cyclic pitch input to the rotors to illustrate the effect of the application of cyclic pitch to the rotors, and its effect upon the pitching moment created by the shroud and the pitching moment created by the rotor.

By viewing FIG. 12, we see the magnitude of the pitching moment of the fuselage $M_S$ and the moment of the rotor $M_R$ plotted against degrees of cyclic pitch applied to rotors 16 and 18. It will be noted that at 0° cyclic pitch input to the rotors, the magnitude of shroud moment $M_S$ is substantially larger for 300 points of rotor thrust than the magnitude of rotor moment $M_R$. In fact, the nose-up moment on fuselage 12 is about 1650 lbs.. However, as cyclic pitch is applied to rotors 16 and 18, the nose-up moment being created by fuselage 12 decreases rapidly, while the nose-down moment created by the rotor $M_R$ increases slowly, so that at $-11°$ cyclic pitch, the nose-up moment $M_S$ of the shroud or fuselage 12 is balanced by the nose-down moment $M_R$ created by the rotor, such that the vehicle 10 is in a trimmed condition.

Considering our solution to the nose-up problem of the prior art, we may consider this matter mathematically. When we consider that the moment acting upon the vehicle is the moment created by the fuselage, which is a nose-up moment in forward flight, less the moment created by the rotor, which is generally a nose-down moment in forward flight. We can therefore establish the equation:

$$M_{Vehicle} = M_{Shroud} - M_{Rotor} \quad \text{Equation \#1}$$

During forward flight $M_{Shroud} \times M_{FF} - M_{CS}$, where $M_{FF}$ is the moment created by the fuselage normally during forward flight, and $M_{CS}$ is the moment created by the fuselage to the application of cyclic pitch to the rotors. Accordingly, the equation for forward flight is:

$$M_{Vehicle} = (M_{FF} - M_{CS}) - M_{Rotor} \quad \text{Equation \#2}$$

For the forward flight condition of our vehicle 10 at 70 knots, generating 300 lbs. of rotor thrust, with a $-5°$ forward pitch, which is the condition illustrated in the graph of FIG. 12, it will be noted that with the increased application of cyclic pitch, the quantity of moment $M_{CS}$ increases such that at $-11°$ cyclic pitch, the quantity of nose-up ($M_{FF} - M_{CS}$) is equal to the rotor nose-down moment and therefore the vehicle is in trim. It will therefore be seen that the nose-up pitching moment created by the fuselage in forward flight has been brought into balance by the application of cyclic pitch to the rotor.

Figure 13:
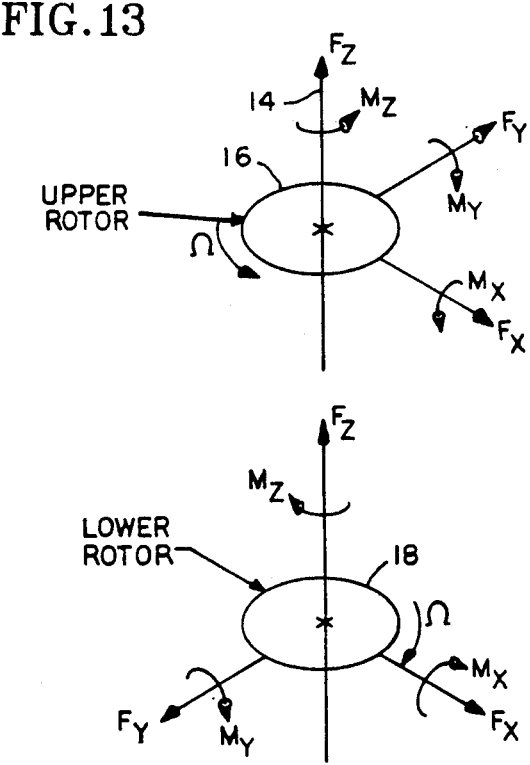
FIG. 13 is a diagrammatic representation of the counter-rotating rotors of our flight vehicle to illustrate how the forces and moments created by one rotor are cancelled by the forces and moments created by the other rotor.

Another advantage of our flight vehicle construction is that by the use of counter-rotating rigid rotors, some forces and moments created by rotor 16 are cancelled by oppositely rotating rotor 18 which forces and moments are cancelled as a function of rotor phasing. Rotor phasing is the azimuthal position at which a blade from rotor 16 passes directly over the blade from rotor 18. This can be appreciated by viewing FIG. 13 in which it will be noted that for a 60° phasing forces $F_Y$ created by rotor 16 are cancelled by counteracting forces $F_Y$ and $F_X$ generated by rotor 18, while the lifting forces $F^X$ and $F_Z$ of the rotors are additive but at a 0° phasing $F_X$ and $F_Z$ from rotor 16 are cancelled by $F_X$ and $F_Z$ of rotor 18, while $F_Y$ from rotor 16 is additive to $F_Y$ of rotor 18 Similarly, at 60° phasing, the moments $M_X$, and $M_Z$ created by rotor 16 are cancelled by equal and opposite moments $M_X$, $M_Y$ and $M_Z$ created by oppositely rotating rotor 18. In addition, the utilization of two counter rotating rotors also eliminates gyroscopic coupling of aircraft pitch and roll.

If one were to substitute a single rotor for our counter-rotating rotors, when such a vehicle experienced a pitching moment, a gyroscopic load would be created which would tend to also roll the vehicle, resulting in a cross-couple system. This would require the addition of a cross-rate feedback control system to the single rotor system. In addition, the single rotor system would require the addition of yaw control mechanisms.

To demonstrate the our invention is capable of producing all required lift, pitch, roll and yaw control to vehicle 10 without the need of any additional equipment, reference will now be made to FIGS. 14a through 14d.

Figure 14A:
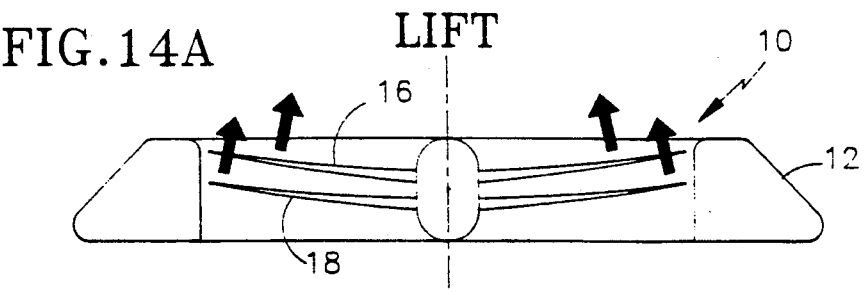
FIG. 14a is a diagrammatic representation of our flight vehicle illustrating how vehicle lift is controlled.

FIG. 14a illustrates our vehicle 10 in a lift control condition. This is produced by applying collective pitch, in equal amounts, to rotors 16 and 18.

Figure 14B:
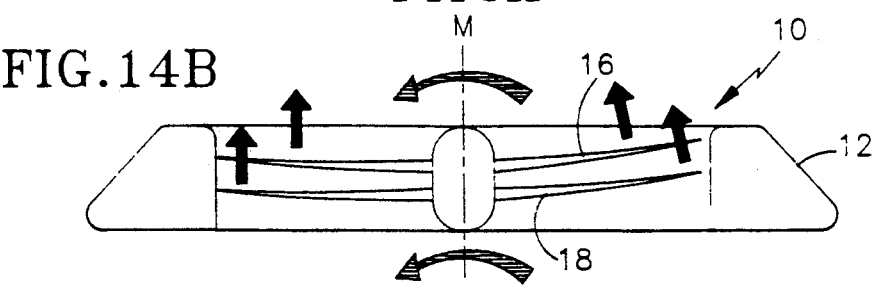
FIG. 14b is a diagrammatic representation of our flight vehicle illustrating how vehicle pitch is controlled.

Pitch control is demonstrated in FIG. 14b wherein equal amounts of longitudinal cyclic pitch is applied to rotors 16 and 18 to therefore shift the center of lift and pressure of the rotors toward the aft station of shroud or fuselage 12 and to also increase the lift and pitching moment generated at the 0° tail station of fuselage 12, as illustrated in connection with FIGS. 6 & 7. It will therefore be seen that the application of cyclic longitudinal pitch to rotors 16 and 18 produces both the desired pitching moment in the rotors, and the additive pitching moment in the shroud.

Figure 14C:
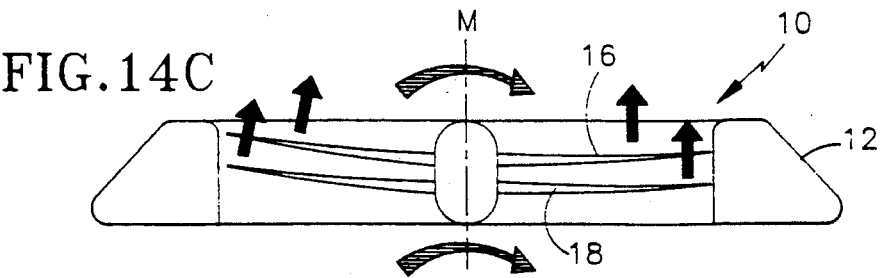
FIG. 14c is a diagrammatic representation of our flight vehicle illustrating how vehicle roll is controlled.

Now considering roll control, attention is called to FIG. 14c in which lateral cyclic pitch is applied to rotors 16 and 18 in equal amounts so as to shift the center of pressure and lift leftwardly as illustrated in FIG. 14c so as to create a rotor moment causing vehicle 10 to roll in a clockwise direction, and similarly, as described in connection with FIGS. 7 and 8, creating a shroud rolling moment additive to the rotor rolling moment.

Figure 14D:
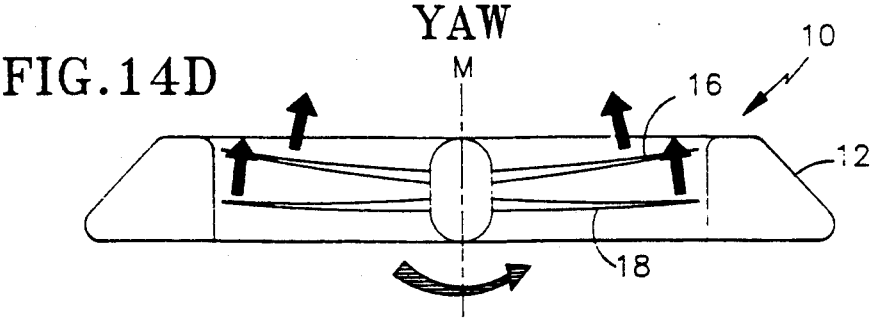
FIG. 14d is a diagrammatic representation of our flight vehicle illustrating how vehicle yaw is controlled.

For yaw control, as illustrated in FIG. 14d, differential collective pitch is applied to rotors 16 and 18, thereby producing a torque differential which will cause yaw or rotating motion of our vehicle 10.

Still another advantage of our construction is that appropriate application of rotor cyclic pitch will reduce vehicle stress and vibration. This is accomplished by selectively applying longitudinal cyclic and lateral cyclic pitch to the blades of rotors 16 and 18 so as to bring the centers of lift of each rotor closer to axis of rotation 14, and thereby reduce the moment which these centers of lift create, thereby also reducing the load which they impose upon the blades. This reduced load upon the blades of rotors 16 and 18 reduces stress on both the blades and in the control system used to control the blades. This reduced loading of the blades also reduces system vibration since these loads are vibratory loads.

We claim:
1. A flight vehicle comprising:
   a. a toroidal fuselage concentric about an axis,
   b. two counter-rotating bladed rotors located within said toroidal fuselage,
   c. means to position said rotors for rotation about an axis of rotation which is coincident with the fuselage axis, and
   d. means to totally control the motions of said vehicle in lift, pitch, roll and yaw in both hover and forward flight comprising:
      1) means for applying both collective and cyclic pitch changes to the blades of said rotors so that the moments created by the rotors by the application of pitch change to the rotor blades cooperate with the moments created by airflow through said toroid fuselage to produce the desired lift, pitch, yaw and roll control of the flight vehicle, said moments created by the airflow through said toroidal fuselage being controllable as a function of rotor cyclic pitch.

2. A flight vehicle according to claim 1 wherein said last mentioned means is operable so that the nose-up pitching moment created by said toroidal fuselage in forward light is compensated for by the application of cyclic pitch to said rotors to thereby change the pattern of air flowing into said toroidal fuselage so as to reduce the nose-up pitching moment created by the toroidal fuselage to a point where it is equal to the nose-down moment created by the rotors so as to effect vehicle trim.

3. A flight vehicle according to claim 1 wherein said toroidal fuselage is substantially hollow so as to provide space for carrying the necessary vehicle controls, payload, fuel and propulsion mechanism.

4. A flight vehicle according to claim 3 and including an engine supported by such fuselage and operable to generate a high velocity gas stream to propel said vehicle.

5. A flight vehicle according to claim 4 wherein said rotors are rigid rotors.

6. A flight vehicle according to claim 1 wherein the rotors are of a given diameter and the air inlet lip established by said toroidal fuselage is of a given radius, and wherein the ratio of the air inlet lip radius of the fuselage to the diameter is at least about 0.04.

7. A flight vehicle according to claim 5 wherein said rotors are supported from a rotor housing and said means positioning said rotors constitute a plurality of support struts extending from said toroidal fuselage radially inwardly to said rotor housing and each being operatively connected at their opposite ends to the housing and the fuselage, respectively, and wherein said toroidal fuselage and said support struts are fabricated of light-weight, composite material.

8. A flight vehicle according to claim 7 wherein said composite material comprises a plurality of high tensile strength fibers joined by cured epoxy resin to produce a light-weight and strong vehicle.

9. A flight vehicle according to claim 5 and wherein said fuselage is shaped as a closed toroid for structural integrity.

10. A flight vehicle according to claim 8 wherein said support struts are hollow, and including a rotor drive motor located in said fuselage, and a drive shaft system extending from said drive motor to said rotors to drive said rotors for rotation about said axis of rotation.

11. A flight vehicle according to claim 1 wherein each rotor of the counter-rotating rigid rotors cancels the torque, the gyroscopic coupling of aircraft pitch and roll, and the vibratory loads created by the other rotor so as to produce an uncoupled rotor system.

12. In a flight vehicle according to claim 1 including the method of controlling the lift applied to the vehicle comprising changing the collective pitch to the blades of at least one of said rotors to thereby produce lift creating forces on both the rotor and the fuselage.

13. A flight vehicle according to claim 1 including the method of controlling vehicle pitch comprising the selectively applying longitudinal cyclic pitch to the blades of at least one of said rotors to thereby produce pitch creating forces on both the rotor and the fuselage.

14. A flight vehicle according to claim 1 including the method of controlling vehicle roll comprising selectively applying lateral cyclic pitch to the blades of at least one of said rotors to thereby produce roll creating forces on both the rotor and the fuselage.

15. A flight vehicle according to claim 1 including the method of providing yaw control to said vehicle comprising the application of differential collective pitch to the blades of said rotors to thereby produce the required torque differential to effect yaw control.

16. In a flight vehicle according to claim 1, the method of abating the nose-up moment created by the toroidal fuselage during forward flight comprising selectively applying cyclic pitch to at least one of said rotors to selectively vary the pattern of air flowing into said fuselage to thereby produce a counteracting pitching moment on said toroidal fuselage to thereby reduce the total nose-up pitching moment created by the fuselage in forward flight until it is substantially equal to the nose-down pitching moment created by the rotors.

17. In a flight vehicle according to claim 1, the method of controlling vehicle vibration and stress comprising selectively applying cyclic pitch to at least one of said rotors to cause the rotor center of lift to shift toward the axis of rotation, thereby reducing the moment so imposed upon the rotor and, hence, the load and stress created thereby, while simultaneously reducing vehicle vibration caused by vibratory loads.

* * * * *

UNITED STATES PATENT AND TRADEMARK OFFICE
CERTIFICATE OF CORRECTION

PATENT NO. : 5,152,478

DATED : October 6, 1992

INVENTOR(S) : JAMES P. CYCON ET AL

It is certified that error appears in the above-identified patent and that said Letters Patent is hereby corrected as shown below:

Column 1, between lines 6 and 7 insert the following paragraph:

--The invention described herein was made in the performance of work under NASA Contract No. NAS2-12431. A waiver of rights has been granted.--

Claim 2, column 8, line 65, "light" should read --flight--

Claim 6, column 9, line 17 "lip" should be deleted.

Signed and Sealed this

Ninth Day of November, 1993

Attest:

Attesting Officer

BRUCE LEHMAN

Commissioner of Patents and Trademarks